Patented May 2, 1950

2,505,825

UNITED STATES PATENT OFFICE 2,505,825

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application March 12, 1947, Serial No. 734,207

8 Claims. (Cl. 252—342)

This invention relates to new chemical products or compounds and to the use and manufacture of same.

One object of our invention is to provide new chemical products or compounds that are particularly adapted for use as demulsifiers for petroleum emulsions, and which are also capable of various other uses as hereinafter described.

Another object of our invention is to provide a practical method of making the said compounds or chemical products.

Another object of our invention is to provide a novel process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

And still another object of our invention is to provide an economical and rapid process for separating emulsions which have been prepared under controlled conditions from mineral oil, such as crude oil and relatively soft waters or weak brines. Controlled emulsification and subsequent demulsification under the conditions just mentioned, are of significant value in removing impurities, particularly inorganic salts from pipeline oil.

Demulsification as contemplated in the present application, includes the preventive step of commingling the demulsifier with the aqueous component which would or might subsequently become either phase of the emulsion in absence of such precautionary measure. Similarly, such demulsifier may be mixed with the hydrocarbon component.

Briefly stated, the new chemical compounds herein contemplated and particularly for use as demulsifying agents, are obtained by reaction of certain polyethylene glycols with certain fractional esters obtained from ricinoleic acid, glycerol, and certain polycarboxy acids. Such polycarboxy acids employed, particularly dicarboxy acids, must be free from alpha-beta unsaturation, thus eliminating dicarboxy acids having active dienophylic components or structures such as maleic anhydride, citraconic anhydride, etc. Such esters are characterized by the fact that the number of ricinoleic acid radicals present are less than the number of hydroxyl radicals attached to the glycerol radical or glycerol radical entering into each structural unit. It is to be noted that this clearly differentiates the herein contemplated intermediates from those described in our co-pending application, Serial No. 734,206, filed March 12, 1947.

The acidic esters herein contemplated derived from polycarboxy acids as described, ricinoleic acid or its equivalent, and glycerol, may be obtained by various means. For instance, reacting monoricinolein, or diricinolein with a polycarboxy acid or anhydride, or reacting triricinolein with a polycarboxy acid or anhydride, or reacting the polycarboxy acid or anhydride with glycerol and then subsequently reacting such product with ricinoleic acid or with triricinolein, or diricinolein, or monoricinolein. Furthermore, if desired, a combination of the three preceding procedures or equivalent methods may be employed. The manufacture of such products is well known and described in numerous patents and elsewhere in the literature.

Having obtained such sub-resinous polyester of the kind described, such products are then subjected to pyrolytic esterification to give a product which is hydrophile in properties, at least to the extent of being self-emulsifiable.

Attention is directed to our afore-mentioned copending application, Serial No. 666,820, filed May 2, 1946, now abandoned. Said co-pending application is concerned with the oxyalkylation, particularly the oxyethylation, of the same esters as here employed for reaction with nonaethylene glycol or the like. In our said aforementioned co-pending application, Serial No. 666,820, filed May 2, 1946, we stated as follows:

Products of value as demulsifying agents have been prepared by reacting acidic products of the kind previously described with polyhydric alcohols, although not necessarily with polyethylene glycols having a large number of repetitious ether linkages in such proportion and manner as to render such products water soluble or water miscible.

Esterification with a polyethyleneglycol or the like cannot yield the same sort of product as treatment with ethylene oxide, where there is an alcoholic hydroxyl available for reaction. In the intermediate products herein contemplated for reaction with ethylene oxide to yield the final or ultimate compounds, there is present an alcoholic hydroxyl, usually the primary alcoholic hydroxyl of the glyceryl radical or a secondary alcoholic hydroxyl of the glyceryl radical which is susceptible to oxyethylation in counter distinction to the ricinoleyl hydroxyl radical. Ordinarily speaking, under conditions of reaction usually employed in the manufacture of such products as have been described, etherization does not take place. More specifically, the conventional conditions of reaction in which a hydroxylated compound is treated with a polyethylene glycol, does not yield an ether. For this particular reason, one would not expect treatment with ethylene oxide to yield the same sort of products as would be obtained by esterification.

Attention is directed to the previous limitation which excludes maleic anhydride, citraconic anhydride, etc.

Previous reference has been made to our copending application insofar that it is concerned with a description of such acidic fractional esters.

A preferred ester product may be obtained by esterification reaction between triricinolein and a dibasic carboxylic acid, such as phthalic acid. Ricinoleic acid may be indicated by the following formula:

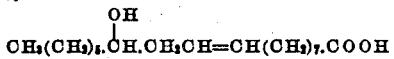

which may be conveniently abbreviated for many purposes to HORCOOH. Employing OHRCOO as the acyloxy group of ricinoleic acid, triricinolein may be represented by the formula

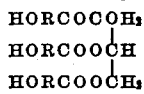

and contains the residue of the polyhydric alcohol glycerol which may be represented as

Triricinolein readily esterifies with phthalic acid and if three moles of phthalic anhydride or acid are caused to react with one mole of triricinolein, a fractional acidic ester will be obtained according to the following reaction:

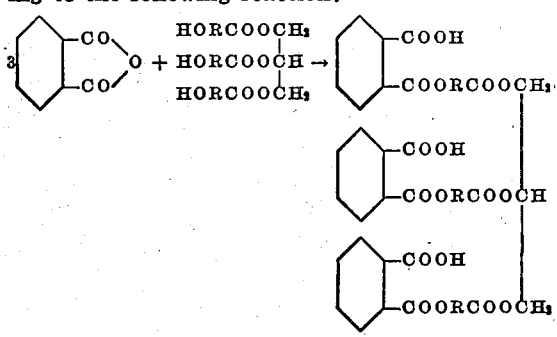

It is not necessary to use three moles of phthalic anhydride per mole of triricinolein and if desired, one may use one or two moles although the preference is to use approximately 2 to 2½ or 3 moles. Likewise, in carrying on the esterification reactions broadly, without limitation to the particular type herein employed as intermediates, it is not essential that a carboxylic group of the dibasic carboxylic acid react with the alcoholiform hydroxyl in the ricinoleyl radical while the recinioleyl radical remains directly connected with the polyhydric alcohol radical. One might react ricinoleic acid monophthalate, obtained by reaction between ricinoleic acid and phthalic anhydride, mole for mole, with glycerol in the ratio of three moles of the fractional ester for one mole of glycerol. This would yield a mixture of compounds such as the following:

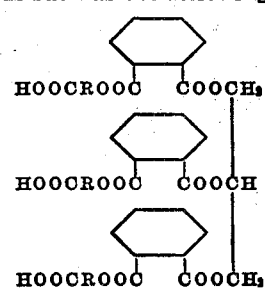

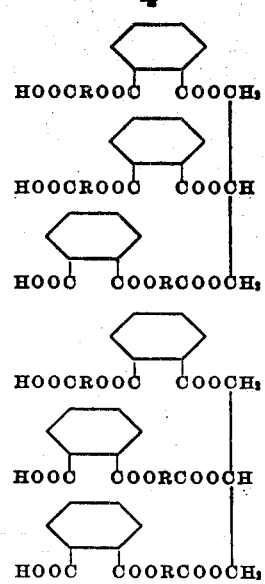

Not only may compounds of the above type be obtained by the procedure previously described, but such compounds may occur to a greater or lesser degree as the result of molecular rearrangement in the production of acidic fractional esters from triricinolein and various polycarboxy acids as previously mentioned, provided one employs temperatures in excess of 210° C. or employs catalysts, or both.

In carrying on the esterification reaction there may develop cross-linkage either through the polyhydric alcohol or through the polybasic carboxylic acid, due to the poly-functionality of these materials. For example, in an esterification reaction between triricinolein and phthalic acid, the resulting product may comprise more complex molecules such as the following which illustrates cross-linkage through the polyhydric alcohol residue:

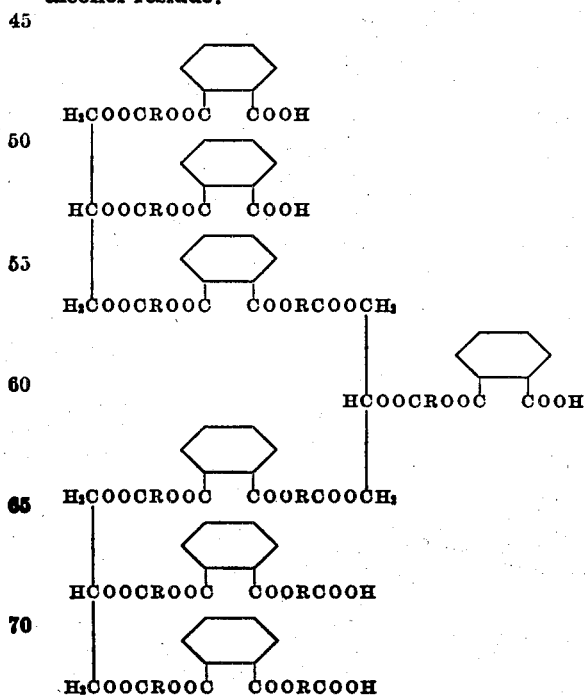

Cross linkage likewise may occur through the polybasic carboxy acid to afford molecular structure such as

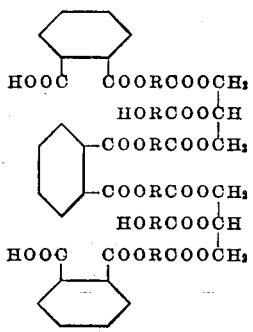

It is apparent that other cross-linkages may occur. Such ester products containing more complex molecules are also suitable. It is also apparent that there may be great variations in the molecular weight of the product. The molecular weight of the ester product as determined by cryoscopic methods or from obvious composition of the ester, usually runs between about 300 and about 4,000 and is seldom over 6,000. Ester products having a molecular weight over about 10,000 preferably are not employed. During the esterification reaction there may be some polymerization and polymerized products as well as simple monomers may be used.

Tricarboxy acids may be employed as reactants in the same manner as dicarboxy acids.

A procedure suitable for the manufacture of intermediate products which may be subjected to reaction with glycols so as to obtain compositions or compounds of the kind herein contemplated, involves procedures similar to that used in the manufacture of modified polyester resins; one particular modification involves the use of ricinoleic acid in combined form only and the products obtained are essentially sub-resinous and viscous liquids, rather than solids, but if solid, they are readily soluble in an inert solvent. The method of producing such materials is well known and involves an esterification reaction. The reactants employed are generally glycerol, castor oil, or ricinoleic acid, along with the polycarboxy acids, particularly the dicarboxy acids previously described. The esterification reaction may be caused to take place readily upon the application of heat, the reaction being more rapid the higher the temperature that is employed, but care should be taken not to employ excessively high temperatures, which would cause decomposition. The reaction may, if desired, be carried out in the presence of an inert solvent, such as xylene, which may be removed upon the completion of the reaction. When water is formed as a reaction product, the esterification reaction may be conducted under a reflux condenser, using a water trap to remove water as it is formed. The reaction can also be hastened by passing through the reacting materials a dried inert gas, such as nitrogen or $CO_2$. Generally speaking, however, the reactions take place rapidly, quickly and completely, simply by heating substances to enter into the reaction, in desired stoichiometric proportions, at a temperature above the boiling point of water, usually between about 110° and 160° C., provided there is no decomposition. The most desirable products are obtained by compositions in which the ratio of moles of polybasic carboxylic acid to moles of hydroxylated partial ester material reacted therewith, is within the ratio of 2 to 1 and 3 to 1.

Such partial ester may consist of a mixture of diricinolein and monoricinolein. The molecular weight of the ester product, as determined by cryoscopic methods, or from the obvious composition of the ester product, usually runs between about 300 and about 4,000 and seldom is over 6,000. It may be mentioned that when the polybasic carboxylic acid is used in the anhydride form, esterification can take place without forming water as a reaction product, unless the second carboxyl radical is involved, and that the use of polybasic carboxy acid in anhydride form is normally preferable for this reason.

During the esterification reaction, there may be some polymerization, especially if conditions of esterification are prolonged. This polymerization is due primarily to formation of more complicated compounds from monomeric forms, through formation of ester linkage, with loss of water. It is to be understood that reference to ester products of the character herein referred to, include possibly polymerized forms, as well as simple esters or monomers.

RESINOUS POLYESTER INTERMEDIATE

Example 1

Mix 296 pounds of phthalic anhydride with 92 pounds of glycerol, and heat for approximately 5 to 10 minutes at approximately 125° C. to 150° C., or longer, until a thin, clear, water-white liquid resin intermediate, containing no unreacted phthalic anhydride, has been produced. The resin intermediate is then mixed with 312 pounds of castor oil and the mixture is heated to from 150° C. to 250° C. for approximately 10 to 30 minutes, or somewhat longer, if required, to complete reaction, after which it is permitted to cool and is diluted with from 10% to 20% of xylene or other inert solvent.

RESINOUS POLYESTER INTERMEDIATE

Example 2

Sebacic anhydride in equivalent amount is substituted for phthalic anhydride in Example 1, preceding.

RESINOUS POLYESTER INTERMEDIATE

Example 3

Adipic acid in equivalent amount is substituted for phthalic anhydride in Example 1, preceding.

RESINOUS POLYESTER INTERMEDIATE

Example 4

Succinic acid or anhydride in equivalent amount is substituted for phthalic anhydride in Example 1, preceding.

RESINOUS POLYESTER INTERMEDIATE

Example 5

Diglycolic acid in equivalent amount is substituted for phthalic anhydride in Example 1, preceding.

RESINOUS POLYESTER INTERMEDIATE

Example 6

One pound mole of monoricinolein is reacted with two pound moles of phthalic anhydride so as to produce an acidic fractional ester.

RESINOUS POLYESTER INTERMEDIATE

Example 7

One pound mole of diricinolein is reacted with two pound moles of phthalic anhydride so as to produce an acidic fractional ester.

RESINOUS POLYESTER INTERMEDIATE

Example 8

The same procedure is followed as in Examples 6 and 7 preceding, except that phthalic anhydride is replaced by various other preferred dicarboxy reactants in stoichiometrical amounts, such as sebacic anhydride, adipic acid, succinic acid, or diglycolic acid.

Although, in light of what has been said previously there appears to be a wide variety of intermediate products which may be used to yield the compositions identical with those herein contemplated, yet casual examination discloses a close relationship between all such intermediates. In each instance, such intermediates are polycarboxy derivatives, particularly dicarboxy derivatives of glyceryl esters of ricinoleic acid along with additional combined glycerol, if required, to insure a structure in which the total valencies of the glyceryl radical or radicals, counting such radical as trivalent, is in excess of the number of ricinoleic acid radicals present, and also characterized by the presence of a reactive hydroxyl radical, other than the ricinoleyl hydroxyl radical. The following characterization differentiates such suitable intermediate from those described in our aforementioned co-pending application, Serial No. 666,820, filed May 2, 1946, in that in the present instance, in any particularly monomeric or structural unit, the number of ricinoleic acid radicals present is less than the number of hydroxyl radicals originally available for esterification, and as a result of this difference certain marked differentiations in structure appear, as for example the following:

(1) A dicarboxy radical may be directly attached to the residual glyceryl hydroxyl group, such as phthalated monoricinolein or phthalated diricinolein where the phthalic acid residue is attached to the glyceryl radical, which is, in essence, attached in a terminal position;

(2) Or in an isomer of the previous type of compound, if the phthalic acid radical or its equivalent is attached to a ricinoleyl hydroxy group, then and in that event the residual glyceryl hydroxyl is susceptible to oxyethylation and again provides means for introducing a terminal polyglycol radical;

(3) The polyglycol radical introduced in the ricinoleyl radical, under any circumstances, instead of being a single long chain may be considered as a branched chain polyglycol radical, or better still, as a plurality of polyglycol radicals having, as desired, from 2 to 4 hydroxyls, or may have variants in which more than one of these characteristic structures appear.

The polyglycols which we employ contain approximately 8 to 12 oxyethylene groups. Our preference is to use the polyethylene glycols, due largely to the fact that they are commercially available and particularly so in two desirable forms. The most desirable form is the so-called nonaethylene glycol which, although consisting largely of nonaethylene glycol, may contain small amounts of heptaethylene and octaethylene glycols, and possibly minor percentages of the higher homologs. Such glycols represent the upper range of distillable glycols, and they may be conveniently referred to as "upper distillable ethylene glycols." There is no particularly good procedure for making a sharper separation on a commercial scale; and it is understood that mixtures of one or more of the glycols may be employed, as well as a single glycol. As pointed out, it is particularly preferred to employ nonaethylene glycol as commercially available, although it is understood that this product contains other homologs, as indicated.

Substantially as desirable as the upper distillable polyethylene glycols, are the lower nondistillable polyethylene glycols. These materials are available in the form of a waxy, water-soluble material, and the general range may vary somewhat from deca- to tetra-decaethylene glycol. As is well understood, the method of producing such glycols would cause some higher homologs to be formed; and thus, even in this instance, there may be present some oxyethylene glycols within the higher range above indicated. One need not point out that these particular compounds consist of mixtures, and that in some instances, particularly desirable esters are obtained by making mixtures of the liquid nonaethylene glycol with the soft, waxy, lower nondistillable polyethylene glycols. For the sake of convenience, reference in the examples will be to nonaethylene glycol; and calculations will be based on a theoretical molecular weight of 414. Actually, in manufacture, the molecular weight of the glycol employed, whether a higher distillable polyethylene glycol or a lower nondistillable polyethylene glycol, or a mixture of the same, should be determined and reaction conducted on the basis of such determination, particularly in conjunction with the hydroxyl or acetyl value.

In considering what is said herein as to difference in structure between compounds obtained by oxyethylation on the one hand and reaction with a polyglycol on the other hand, it may be particularly convenient to refer to a single oxyethylated product derived from the intermediates or previously described reactants discussed in detail. For convenience, we are going to describe this particular compound which is a suitable basis for comparison in the same manner as it is described in our co-pending application, Serial No. 666,820, filed May 2, 1946.

Generically speaking, oxyethylation is conducted in substantially the same manner as applied to a number of other products, in which the ethylene oxide group is introduced between an oxygen atom and a hydrogen atom as, for example, in oxyethylation of high molal acids or high molal alcohols, substituted phenols, etc. Usually, a small amount of alkaline catalyst is added, such as one tenth of 1% to 1% of caustic soda, sodium stearate, sodium methylate, or the like. Oxyethylation is conducted with constant stirring and a gauge pressure of 100 to 200 pounds per square inch is generally satisfactory. The temperature of reaction may be varied from 100° C. to less than 200° C. If desired, an inert solvent may be present, such as xylene, tetralin, cymene, decalin, or the like. The ethylene oxide may be used continuously, provided the addition is regulated so that it is used up more or less uniformly as it enters the reaction vessel or autoclave. Our preference, however, is to add the material batch-wise as indicated and continue oxyethylation, not only until the product is distinctly hydrophile but until it gives a substantially clear solution in water. As to other oxyethylating procedure, attention is directed to the following United States patents and to the following British patent: U. S. No. 2,142,007, dated Dec. 27, 1938, to P. Schlack; U. S. No. 1,845,198, dated Feb. 16, 1932, to O. Schmidt et al.; U. S. No. 1,922,459, dated Aug. 12, 1933, to O. Schmidt

OXYETHYLATED WATER-SOLUBLE DERIVATIVE

Example 1

550 pounds of a sub-resinous compound exemplified by "Resinous polyester intermediate, Example 1" is mixed with ½ pound of sodium methylate and then reacted with approximately 175 pounds of ethylene oxide in three batches of 55 to 60 pounds each. The maximum pressure during the reaction is 135 pounds per square inch gauge pressure, along with a temperature of 140° C. The time of reaction required for each batch varies from 3 to 9 hours. If the molecular weight equivalent of the resinous raw material be considered as 1100, then the amount of ethylene oxide at this point represented roughly a molar ratio of 8 moles of ethylene oxide to one mole of intermediate. The resinous material, prior to oxyethylation, is water insoluble and has an acid number of approximately 45.3. After initial oxyethylation as described, the product begins to show some hydrophile property but does not give a suitable permanent solution and is definitely short of the point where a clear solution is produced. For this reason, it is then treated with approximately 200 pounds of additional ethylene oxide, using about 50 pounds per batch. Each one of the four treatments require approximately 10 hours for reaction, the maximum pressure being 130 pounds gauge pressure, as before, and the temperature somewhat higher than in the initial treatment, to wit, 140° to 150° C. The material at the end of the second treatment is definitely more water miscible but gives a very definite cloudy solution which tends to separate. For this reason, further oxyethylation is indicated. The third series of oxyethylations involve the addition of 220 pounds of ethylene oxide in four batches of 55 pounds each. The conditions of reaction are identical with those employed in the batch steps immediately preceding. The water solubility of the derivative is markedly enhanced. In the last series of oxyethylations there is added 200 pounds of ethylene oxide in four portions of 50 pounds each. In the final series of batch treatments, less time is required, the ethylene oxide being absorbed in approximately five hours and, although the pressure continues in the same range as previously, the temperature employed is somewhat higher, to wit, 155° C. The product obtained is clearly water soluble and gives an excellent and permanent solution. As the result of the above procedure, 550 pounds of sub-resinous material representing roughly ½ mole, is combined with 795 pounds of ethylene oxide to give a final yield of 1345 pounds oxyethylated derivative. This represents 18 moles of ethylene oxide per each ½ mole of resin, or 36 moles of ethylene oxide per mole of resin. Figured as an increase in weight, there is added 795 pounds of ethylene oxide to 550 pounds of resin intermediate, or the amount of ethylene oxide added, based on the amount of resin intermediate used as a raw material, represents 144%. The appearance of the product was that of a deep amber-colored, non-viscous oil. The acid value of this product is 1.3. This product is further identified as L-12865.

The esterification of materials herein described as raw materials or intermediates with a polyethylene glycol or the like, cannot yield the same product as treatment with ethylene oxide, where there is an alcoholic hydroxyl available for reaction. In the intermediate products herein contemplated for reaction with ethylene oxide to yield the final or ultimate compounds, there is present an alcoholic hydroxyl, usually the primary alcoholic hydroxyl of the glyceryl radical, or a secondary alcoholic hydroxyl of the glyceryl radical which is susceptible to oxyethylation, in contradistinction to the ricinoleyl hydroxyl radical. Ordinarily speaking, under conditions of reaction usually employed in the manufacture of such products as have been described, etherization does not take place. More specifically, the conventional conditions of reaction in which a hydroxylated compound is treated with a polyethylene glycol, does not yield an ether. For this particular reason, one would not except treatment with ethylene oxide to yield the same sort of products as would be obtained by esterification. This particular feature differentiates such products from those obtained by esterification from polyethylene glycols. Furthermore, attention has already been directed to the fact that the intermediates subjected to oxyethylation, contain a number of ricinoleic acid radicals which is less than the number of hydroxyl radicals originally available for esterification, and thus is differentiated from our co-pending application, Serial No. 734,206, filed March 12, 1947. Attention is also directed to other certain differences in the reactants obtained by treatment with ethylene oxide, and esterification reactions involving a polyethylene glycol. Oxyethylation is conducted in absence of water. It is generally conducted at temperatures distinctly under 200° C. In fact, this temperature may be taken as the upper limit; unless a catalyst is added, esterification reactions may require much higher temperatures, for instance, from 295° to 335° C. This difference may be illustrated by employing any one of the typical intermediates herein described, for instance "Resinous polyester intermediate, Example 1." In other words, if one subjects a predetermined amount of such intermediate to esterification, or attempted esterification with a polyethylene glycol in predetermined amounts so that the result would be comparable to the products described under the heading "Oxyethylated water-soluble derivative, Example 1," it is possible to make some appraisal of the difference in reaction and resultant depending upon which of the two procedures is employed.

An examination of such reactions is best conducted on a laboratory scale. In other words, if one starts with approximately 552 grams of the mixture described under the heading "Resinous polyester intermediate, Example 1," and having an acid value of approximately 80.6 and a hydroxyl value of approximately 45.3, and adds thereto equivalent of approximately 2 moles of a polyethylene glycol having approximately 10 to 11 structural units, then on completion of the reaction, one would anticipate that there would be a drop in acid value to approximately zero, corresponding to the acid value of the product described under the heading "Water-soluble derivative, Example 1," along with the elimination of a stoichiometric amount of water, which would be equivalent to 14¼ grams.

Such reaction can be conducted in any one of three ways: Absence of a catalyst; presence of an acid catalyst; or presence of the basic catalyst. Actually there is little or no justification for using a basic catalyst, for the reason that under such circumstances one would not expect to obtain a product comparable to that described under the heading "Water-soluble derivative, Example 1," but would expect to get a product in which trans-esterification, which is sometimes referred to as ester interchange or alcoholysis, would take place. (See Organic Chemistry, Fieser and Fieser, 1944, page 182; and Organic Chemistry, Fuson and Snyder, 1942, page 92.)

In conducting these exploratory experiments it becomes obvious that the two points do not coincide, i. e., the production of water of reaction and reduction of the acidity to the value of one or two. In each instance an attempt was made to carry the reaction to the end point indicated both ways. In the case of the acid catalyst, ½% p-toluene sulfonic acid was added. In connection with the polyethylene glycol reactant, attention is directed to the article entitled "Technology of the polyethylene-glycols and Carbowax compounds," Chemical and Engineering News, volume 23, No. 3, page 247 (1945). Such article points out, among other things, why the value of $n$ as herein contemplated represents an average value, rather than specific value for a single compound. The results of these experiments are indicated by the following table:

24 cc. of an oily liquid. Furthermore, in order to obtain the results indicated, instead of using a temperature of approximately 140° C., or somewhat higher, but in any event under 200° C., the temperature actually varied from 215° C. to 335° C. Attention is directed to a very significant fact, and that is that these temperatures employed in experiments A, B, and C, as previously noted, are within the range which may result in rearrangements. This is particularly true in the presence of catalysts. Furthermore, it is to be noted that the above experiments and the analytical values included, are not concerned with a hydroxyethylation of a reactive alcoholic hydroxyl. It will be noted that the herewith appended claims are all concerned with intermediates in which there is present prior to oxyethylation, a reactive alcoholic hydroxyl which is part of a polyhydric alcohol radical, as differentiated from ricinoleyl hydroxyl radical which apparently is not reactive towards ethylene oxide under the circumstances employed.

In comparison with experiments A, B, and C, it has been pointed out previously, as in "Oxyalkylated water-soluble derivatives, Example 1," that such reactant as was used in experiments A,

|  | Experiment A L-24145 | Experiment B L-24146 | Experiment C L-24147 |
|---|---|---|---|
| Resinous Polyester Intermediate Ex. 1 | 552 grams Acid v.—80.6 | 552 grams Acid v.—80.6 | 552 grams. Acid v.—80.6. |
| $HO(C_2H_4O)_nH$ ($n=10$ or 11) | 792 grams | 792 grams | 792 grams. |
| Catalyst | None | ½% toluene sulfonic | ½% sodium methylate. |
| Acid v. of mixture | 32.2 | 32.4 | 30.0. |
| Conditions to bring acid value to about 2 | Could not get below 10.3. | Could not get below 16.0. | Could not get below 6.9. |
| Time | 6 hours | 6 hours | 6 hours. |
| Maximum temperature | 335° C | 285° C | 315° C. |
| Water eliminated at this point | 100 cc. (24 cc. oil) | 160 cc | 40 cc. (12 cc. oil). |
| Remarks | Aqueous soln. milky | Aqueous soln. milky | Aqueous soln. milky. |
| Conditions to bring about elimination of 14¼ g. water (Theoretical): |  |  |  |
| Time | 1½ hours | 1 hour | 3 hours. |
| Maximum Temperature | 295° C | 215° C | 300° C. |
| acid v. at this point | 20.1 | 21.5 | 12.65. |
| Remarks | Clear oil; cloudy soln. with water. | Clear oil; cloudy soln. with water. | Clear oil; cloudy soln. with water. |

In comparison with experiments A, B, and C, it has been pointed out previously that the resinous polyester intermediate can be treated with ethylene oxide at comparatively low temperature, for instance 140° C. in absence of water, to give a product which is clearly water soluble and which has an average molecular weight approximately equivalent to that of products obtained in experiments A, B, and C, provided there was complete chemical combination. The acid value of the oxyethylated derivative was approximately 2.

In examining experiments A, B, and C, it is to be noted that it was impossible to reduce the acid value in any one of the three cases to that obtainable by oxyethylation, to wit, a value of 2. Actually, the values vary from 12 to 20. Furthermore, the theoretical amount of water which would be expected to be eliminated in experiments A, B, and C, so as to give a product identical previously referred to as Example 1, would be 14¼ grams of water. Actually, when 14¼ grams of water had been eliminated in all three cases, the acid value varied from 12 to approximately 20. On the other hand, when the minimum acid value was obtained, even though it did not approach the value of 2, the amount of water eliminated was a great deal more than theoretical, varying from 40 cc., including 12 cc. of an oily liquid, to 160 cc., and in one instance there was an elimination of 100 cc. of water along with B, and C, can be treated with ethylene oxide under comparatively low temperatures, approximately 140° C. to 150° C., in absence of water, to give a water-soluble product having an average molecular weight approximately equivalent to that of the products obtained in experiments A, B, and C, provided there was complete chemical reaction. The said value of the oxyalkylated derivatives was approximately 1 or 2.

In light of what has been said as to the nature of the reactions taking place, and as to the results obtained in the above experiments, it is perfectly obvious that there is a very marked difference in the nature of the products obtained, depending on whether an acidic fractional ester is subjected to oxyethylation or whether it is subjected to an esterification with a polyglycol in an effort to obtain substantially the same product; although for sake of brevity reference is made only to products obtained by phthalation, actually other experiments conducted with other polycarboxy acids, particularly succinic acid, adipic acid, diglycolic acid, etc., indicate that results are substantially the same.

In light of the experiments above reported, it is obvious that if one takes a product such as triricinolein monophthalate, triricinolein diphthalate, triricinolein triphthalate, or any analogous fractional ester derived from some other polycarboxy acid such as adipic acid, succinic acid, maleic acid, or adduct acids of succinic or maleic acids, or the like, one can obtain a variety of products which are characterized by the fact that they are dehydrated in the sense that the amount of water eliminated during the reactions is approximately twice theoretical required to eliminate the free carboxyl radicals; and the products are also characterized additionally by the fact that there is still a significant residual acidity. Conditions seem to be approximately the same regardless of whether a catalyst is used or no catalyst is used. The catalyst may be an acid, such as an aromatic sulfonic acid or it may be an alkaline material such as sodium stearate, sodium carbonate, caustic soda, sodium methylate, etc. In order to illustrate this type of reaction the following illustrations are included and which, for convenience, are substantially the large scale equivalents of experiments A, B, and C.

FINAL COMPOSITION OF MATTER

*Example 1*

552 pounds of a material described under the heading "Resinous polyester intermediate, Example 1" are mixed with approximately 792 pounds of a polyethylene glycol consisting of a mixture of nonaethylene glycol, decaethylene glycol and undecaethylene glycol, or if desired one may use approximately 10% less of nonaethylene glycol, that is approximately 713 pounds of nonaethylene glycol. The products are heated with a catalyst for approximately 6 hours with constant stirring at about 285° C. to 335° C., or even as high as 350° C. At the end of this time, the water eliminated amounts to about 100 pounds, along with about 25 pounds of oil. It is to be noted that actually the theoretical amount of water could not be attributed to an esterification reaction, for the reason that to eliminate even a theoretical amount of water, for instance 14¼ pounds, requires a temperature sufficient to cause pyrolysis of triricinolein, to wit, 295° C. It happens, however, that this is not the case when an acid catalyst is used as will be pointed out in connection with experiment B. The appearance of the oil and the fact that the temperatures go beyond the pyrolytic point of triricinolein are strong indications that certain complex changes take place, such as appear in the dehydration of castor oil. The nature of these changes is rather difficult to determine. For convenience, reference is made to "Protective and Decorative Coatings" by Mattiello, vol. I, chapter 4, John Wiley & Sons, New York (1941). However, the fact that the dehydration of castor oil has taken place (phthalic acid being split off instead of water but the reaction being the same as, for example, when castor oil is first acetylated and then subjected to dehydration by splitting off acetic acid instead of water) is only a partial explanation. The reason for this statement is that where water split off corresponds to the theoretical amount, one still finds the acid value in the neighborhood of 20, compared with original value of 80. The final product is a clear somewhat viscous oil, giving a cloudy solution in water. The acid value of the final product, after being heated to a maximum of 335° C., is 20.

FINAL COMPOSITION OF MATTER

*Example 2*

The preceding example is repeated but there is added to the reaction mass a catalyst consisting of approximately 6¾ pounds of toluene sulfonic acid. In this instance we have found that complete reaction could be obtained at lower temperature than when no catalyst was employed, for example at a maximum of 285° C. instead of 335° C., even though the time of reaction was approximately the same, that is, 6 hours. Also in the use of the acid catalyst, the amount of water eliminated was unusually large, for instance, 160 pounds instead of 100 pounds. Note that in the example previously shown and in the present instance, water refers to the aqueous distillate which may contain other water-soluble materials. The final product was comparable in all respects to the products obtained without the use of a catalyst. The fact that the catalyst speeded up the reaction, is also indicated by the fact that the theoretical amount of water, 14¼ pounds, can be eliminated in an hour instead of 1½ hours at a lower temperature, to wit, 215° C. At this point, i. e. at the point where the theoretical amount of water was eliminated, the product showed about the same acidity as the comparable product had without a catalyst, for instance, an acid value of about 21. It is to be noted that the amount of water eliminated under these circumstances is usually high and difficult to explain on any rational basis. Indications are that the polyglycol radical is not destroyed. This is suggested by the fact that the final product is as hydrophile as if no catalyst were employed, or as if an alkaline catalyst were used. The amount of water eliminated simply points to the complexity of the reaction but offers no satisfactory explanation.

FINAL COMPOSITION OF MATTER

*Example 3*

The same procedure was used as previously, except that the catalyst employed was approximately 6¾ pounds of sodium methylate. The reaction was heated for approximately 6 hours at 315° C. with the elimination of 40 pounds of water and 12 pounds of a water-soluble oil. The acid value was reduced to a maximum of about 12½ but increased subsequently to about 30 in the final product. The theoretical amount of water, to wit 14¼ pounds, was eliminated by 3 hours of heating at 300° C. The acid value at this point dropped to less than ¼ original value or about 12½. The final product was comparable to the materials obtained in the two previous examples.

Due to the fact that the castor oil dehydrates and probably forms, at least in part, conjugated bonds which lead to a Diels-Alder adduct, or in view of the fact that a Clocker type adduct could be formed at such temperature, we have specified that the polycarboxy acids of the type having unsaturated bonds, such as maleic acid or anhydride, citraconic acid or anhydride, should be avoided. We have found that this type of polycarboxy acid is much less satisfactory and, in fact very apt to yield rubbery or almost insoluble masses. For this specific reason it is our preference to use polycarboxy acids, such as phthalic acid or anhydride, adipic acid, diglycolic acid, etc., i. e., materials which cannot form olefinic addition products by virtue of the reactive ethylenic structure. This, of course, does not interfere with the use of products obtained by first reacting maleic anhydride, citraconic anhydride, or the like, with butadiene, cyclopentadiene, or other suitable reactants capable of addition.

FINAL COMPOSITION OF MATTER

Example 4

The same procedure is followed as in Examples 1 to 3, preceding, except that the fractional ester exemplified by "Resinous polyester intermediate, Example 1," is replaced by "Resinous polyester intermediate, Example 3."

FINAL COMPOSITION OF MATTER

Example 5

The same procedure is followed as in Examples 1 to 3, preceding, except that the fractional ester exemplified by "Resinous polyester intermediate, Example 1," is replaced by "Resinous polyester intermediate, Example 4."

In connection with these reactions it will be noted that, as previously pointed out, the reactions are conducted at a temperature above the pyrolytic point of triricinolein (castor oil), which is commonly accepted as being about 265° to 280° C. but in any event, the reaction is not conducted at a temperature higher than 365° C. and preferably within the range of 300° C. to 340° C. The reaction may be conducted in the presence or absence of a catalyst and preferably is conducted in the presence of an alkaline catalyst. In each case the reaction is conducted so that the amount of water eliminated is at least twice theoretical as would be obtained by reaction of the carboxyl radicals alone, and in any event, the final product still has a significant acid value. The products obtained must be capable of giving at least cloudy solutions or sols with water and thus are characteristically hydrophile. The expression "hydrophile" is used to distinguish from such products which may become sub-resinous or sub-rubbery so as to no longer exhibit hydrophile properties, at least they are not even self-emulsifying in water.

In light of what has been said, it is obvious that the only way these materials can be characterized is by the method of manufacture. Since the method of manufacture involves the reduction in both the carboxyl value and hydroxyl value of the mixture, it is obviously esterification. Since it involves the elimination of water over and above that which is represented by the esterification reaction per se, one must include pyrolysis. Thus, for convenience, we are referring to this reaction in what appears to be the most suitable terminology—as a pyrolytic esterification reaction. The mixture reactants should be such that the amount of glycol added is at least, stoichiometrically, equivalent to one hydroxyl radical of the acidic fractional ester and preferably is stoichiometrically equivalent (based on elimination of one hydroxyl only by the polyglycol) to all the carboxyl radicals present in the acidic fractional ester. It has been previously indicated why polycarboxy acids, particularly dicarboxy acids having alpha-beta unsaturations, are excluded; namely, for the reason that such dienophylic acids may enter into complex reactions giving resinous or rubbery resultants which are unsatisfactory and exhibit little or no hydrophile properties.

Conventional demulsifying agents employed in the treatment of oil field emulsions, are used as such, or after dilution with any suitable solvent, such as water; petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, and sulfur dioxide extract obtained in the refining of petroleum, etc., may be employed as diluents. Similarly, the material or materials employed as the demulsifying agents of our process may be admixed with one or more of the solvents customarily used in connection with conventional demulsifying agents. Moreover, said material or materials may be used alone, or in admixture with other suitable well-known classes of demulsifying agents.

It is well known that conventional demulsifying agents may be used in a water-soluble form, or in an oil-soluble form, or in a form which exhibits both oil and water solubility. Sometimes they may be used in a form which exhibits relatively limited oil solubility. However, since such reagents are sometimes used in a ratio of 1 to 10,000 or 1 to 20,000 or even 1 to 30,000, or even 1 to 40,000 or 1 to 50,000 in desalting practice such an apparent insolubility in oil and water is not significant because said reagents undoubtedly have solubility within the concentration employed. This same fact is true in regard to the material or materials employed as the demulsifying agent of our process.

We desire to point out that the superiority of the reagent or demulsifying agent contemplated in our process, is based upon its ability to treat certain emulsions more advantageously and at somewhat lower cost than is possible with other available demulsifiers or conventional mixtures thereof. It is believed that the particular demulsifying agent or treating agent herein described, will find comparatively limited application so far as the majority of oil field emulsions are concerned, but we have found that such a demulsifying agent has commercial value as it will economically break or resolve oil field emulsions in a number of cases which cannot be treated as easily or at so low a cost with the demulsifying agents heretofore available.

In practicing our process for resolving petroleum emulsions of the water-in-oil type, a treating agent or demulsifying agent of the kind above described, is brought into contact with or caused to act upon the emulsion to be treated, in any of the various apparatus now generally used to resolve or break petroleum emulsions with a chemical reagent, the above procedure being used either alone or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to the emergence of said fluids. This particular type of application is decidedly feasible when the demulsifier is used in connection with acidification of calcareous oil-bearing strata, especially if suspended in or dissolved in the acid employed for acidification.

A somewhat analogous use of our demulsifying agent is in the removal of a residual mud sheath which remains after drilling a well by the rotary method. See U. S. Patent No. 2,135,909, dated November 8, 1938, to Monson. Sometimes the drilling mud contains added calcium carbonate or the like to render the mud susceptible to reaction with hydrochloric acid or the like, and thus expedite its removal. Our compound is particularly adapted for use in connection with such treatment involving the use of strong mineral acid.

One preferred and more narrow aspect of our invention insofar as it is concerned with demulsification of petroleum emulsions of the water-in-oil type, is concerned with the admixture of the ester as described, with a viscosity reducing solvent such as the various solvents enumerated, particularly aromatic solvents, alcohols, ether alcohols, etc., as previously specified. The word "solvent" is used in this sense to refer to the mixture if more than one solvent is employed, and generally speaking, it is our preference to employ the demulsifier in a form representing 40% to 85% demulsifier and 15% to 60% solvent, largely, if not entirely nonaqueous and so selected as to give a solution or mixture particularly adaptable for proportional pumps or other measuring devices. The following examples will illustrate this aspect of our invention:

DEMULSIFIER

Example 1

| | Per cent |
|---|---|
| Ester, exemplified by "Final composition of matter, Example 1" | 60 |
| Xylene | 20 |
| Isopropyl alcohol | 20 |

DEMULSIFIER

Example 2

| | Per cent |
|---|---|
| Ester, exemplified by "Final composition of matter, Example 2" | 70 |
| Cresylic acid | 20 |
| Normal butyl alcohol | 10 |

DEMULSIFIER

Example 3

| | Per cent |
|---|---|
| Ester, exemplified by "Final composition of matter, Example 3" | 70 |
| Aromatic petroleum solvent | 10 |
| Isobutyl alcohol | 10 |
| Acetone | 10 |

DEMULSIFIER

Example 4

| | Per cent |
|---|---|
| Ester, exemplified by "Final composition of matter, Example 4" (ester obtained by use of alkaline catalyst) | 65 |
| Methyl alcohol | 15 |
| Dichloroethylether | 20 |

(The above proportions represent percentage by weight.)

In the hereto appended claims the word "water-miscible" is employed to designate a sol or solution which is permanent for either an indefinite period of time or either for such extended period of time as would unquestionably permit its utilization for the herein designed purposes without undue difficulties.

For reasons previously stated, the product herein contemplated, and particularly for use as a demulsifying agent, is conveniently described as a hydrophile pyrolytic esterification product derived by reaction between (A) an acidic triricinolein ester of a dicarboxy acid having not over 10 carbon atoms and characterized by the fact that there is present at least one dicarboxy acid carboxyl radical for each triricinolein radical, and all dicarboxy acid radicals are directly attached to the ricinoleyl radical; and (B) a polyalkylene glycol having at least 8 and not more than 17 ether linkages and the alkylene radical thereof containing at least 2 and not more than 6 carbon atoms; said pyrolytic esterification product being further characterized by the fact that it is the resultant of a pyrolytic esterification reaction conducted within the temperature range of 265° to 365° C., with the proviso that (a) the amount of water evolved during said pyrolytic esterification is at least twice that theoretically obtainable from the complete reaction of the free carboxyl radicals present and (b) that said resultant of the pyrolytic esterification reaction still has a significant acid value.

In our co-pending application, Serial No. 666,820, filed May 2, 1946, we have included a series of comparative tests showing the much greater effectiveness of the compounds therein contemplated on a number of typical emulsions, compared with the compounds herein contemplated. It has been our experience that on an equivalent basis such compounds as contemplated in the afore-mentioned co-pending application, Serial No. 666,820, are usually better and more effective. However, we have also found a sizable number of emulsions wherein the compounds herein contemplated appear to be better than any other compound available. They seem to be made-to-order, so to speak, for such specific emulsions. Also, we have found instances in break inducing in the doctor treatment of sour hydrocarbons, where these particular reagents are more effective than are others available. In other words, even though we recognize that compared with many other types, those herein contemplated may have rather limited utility, yet there are instances where they seem to serve more effectively and more economically than any others with which we are now acquainted.

Having thus described our invention, what we claim as new and desire to secure by Letters Patent is:

1. A process for breaking petroleum emulsions of the water-in-oil type, characterized by subjecting the emulsion to the action of a demulsifying agent comprising a hydrophile pyrolytic esterification product derived by reaction between (A) an acidic ricinoleic acid-polycarboxy acid-glycerol ester, said ricinoleic acid ester containing at least one glyceryl radical as an integral part thereof and being the ester of a polycarboxy acid having not over 10 carbon atoms; said ester being additionally characterized by the fact that (a) the total number of ricinoleic acid radicals is less than the hypothetical number of hydroxyl radicals originally in combination with a glyceryl radical, and (b) the presence of a reactive hydroxyl radical, said hydroxyl radical being an alcoholic hydroxyl as differentiated from a ricinoleyl hydroxyl radical; and (B) a polyalkylene glycol having at least 8 and not more than 17 ether linkages and the alkylene radical thereof containing at least 2 and not more than 6 carbon atoms; said pyrolytic esterification product being further characterized by the fact that it is the resultant of a pyrolytic esterification reaction conducted within the temperature range of 265° C. to 365° C., with the proviso that (1) the amount of water evolved during said pyrolytic esterification is at least twice that theoretically obtainable from the complete reaction of the free carboxyl radicals present, and that (2) said resultant of the pyrolytic esterification reaction still has a significant acid value.

2. A process for breaking petroleum emulsions of the water-in-oil type, characterized by subjecting the emulsion to the action of a demulsifying agent comprising a hydrophile pyrolitic esterification product derived by reaction between (A) an acidic ricinoleic acid-polycarboxy acid-glycerol ester; said ricinoleic acid ester containing at least one glyceryl radical as an integral part thereof and being the ester of a dicarboxy acid having not over 10 carbon atoms; said ester being additionally characterized by the fact that (a) the total number of ricinoleic acid radicals is less than the hypothetical number of hydroxyl radicals originally in combination with a glyceryl radical; and (b) the presence of a reactive hydroxyl radical; said hydroxyl radical being an alcoholic hydroxyl as differentiated from a ricinoleyl hydroxyl radical; and (B) a polyalkylene glycol having at least 8 and not more than 17 ether linkages and the alkylene radical thereof containing at least 2 and not more than 6 carbon atoms; said pyrolytic esterification product being further characterized by the fact that it is the resultant of a pyrolytic esterification reaction conducted within the temperature range of 265° C. to 365° C., with the proviso that (1) the amount of water evolved during said pyrolytic esterification is at least twice that theoretically obtainable from the complete reaction of the free carboxyl radicals present, and that (2) said resultant of the pyrolytic esterification reaction still has a significant acid value.

3. A process for breaking petroleum emulsions of the water-in-oil type, characterized by subjecting the emulsion to the action of a demulsifying agent comprising a hydrophile pyrolytic esterification product derived by reaction between (A) an acidic ricinoleic acid-polycarboxy acid-glycerol ester; said ricinoleic acid ester containing at least one glyceryl radical as an integral part thereof and being the ester of a dicarboxy acid having at least 4 and not over 8 carbon atoms; said ester being additionally characterized by the fact that (a) the total number of ricinoleic acid radicals is less than the hypothetical number of hydroxyl radicals originally in combination with a glyceryl radical; and (b) the presence of a reactive hydroxyl radical; said hydroxyl radical being an alcoholic hydroxyl as differentiated from a ricinoleyl hydroxyl radical; and (B) a polyalkylene glycol having at least 8 and not more than 17 ether linkages and the alkylene radical thereof containing at least 2 and not more than 6 carbon atoms; said pyrolytic esterification product being further characterized by the fact that it is the resultant of a pyrolytic esterification reaction conducted within the temperature range of 265° C. to 365° C., with the proviso that (1) the amount of water evolved during said pyrolytic esterification is at least twice that theoretically obtainable from the complete reaction of the free carboxyl radicals present, and that (2) said resultant of the pyrolytic esterification reaction still has a significant acid value.

4. A process for breaking petroleum emulsions of the water-in-oil type, characterized by subjecting the emulsion to the action of a demulsifying agent comprising a hydrophile pyrolytic esterification product derived by reaction between (A) an acidic ricinoleic acid-polycarboxy acid-glycerol ester; said ricinoleic acid ester containing at least one glyceryl radical as an integral part thereof and being the ester of a dicarboxy acid having not over 10 carbon atoms; said ester being additionally characterized by the fact that (a) the total number of ricinoleic acid radicals is less than the hypothetical number of hydroxyl radicals originally in combination with a glyceryl radical; and (b) the presence of a reactive hydroxyl radical; said hydroxyl radical being an alcoholic hydroxyl as differentiated from a ricinoleyl hydroxyl radical and with the additional proviso that said ricinoleic acid-dicarboxy acid-glycerol ester shall have an acid value within the limits of 40 to 125; and (B) a polyalkylene glycol having at least 8 and not more than 17 ether linkages and the alkylene radical thereof containing at least 2 and not more than 6 carbon atoms; said pyrolytic esterification product being further characterized by the fact that it is the resultant of a pyrolytic esterification reaction conducted within the temperature range of 265° to 365° C., with the proviso that (1) the amount of water evolved during said pyrolytic esterification is at least twice that theoretically obtainable from the complete reaction of the free carboxyl radicals present, and that (2) said resultant of the pyrolytic esterification reaction still has a significant acid value.

5. A process for breaking petroleum emulsions of the water-in-oil type, characterized by subjecting the emulsion to the action of a demulsifying agent comprising a hydrophile pyrolytic esterification product derived by reaction between (A) an acidic ricinoleic acid-polycarboxy acid-glycerol ester; said ricinoleic acid ester containing at least one glyceryl radical as an integral part thereof and being the ester of a dicarboxy acid having not over 10 carbon atoms; said ester being additionally characterized by the fact that (a) the total number of ricinoleic acid radicals is less than the hypothetical number of hydroxyl radicals originally in combination with a glyceryl radical; and (b) the presence of a reactive hydroxyl radical; said hydroxyl radical being an alcoholic hydroxyl as differentiated from a ricinoleyl hydroxyl radical and with the additional proviso that said ricinoleic acid-dicarboxy acid-glycerol ester shall have an acid value within the limits of 40 to 125 and a hydroxyl value within the limits of 25 to 100; and (B) a polyalkylene glycol having at least 8 and not more than 17 ether linkages and the alkylene radical thereof containing at least 2 and not more than 6 carbon atoms; said pyrolytic esterification product being further characterized by the fact that it is the resultant of a pyrolytic esterification reaction conducted within the temperature range of 265° C. to 365° C., with the proviso that (1) the amount of water evolved during said pyrolytic esterification is at least twice that theoretically obtainable from the complete reaction of the free carboxyl radicals present, and that (2) said resultant of the pyrolytic esterification reaction still has a significant acid value.

6. The process of claim 5 wherein the dicarboxy acid is adipic acid.

7. The process of claim 5 wherein the dicarboxy acid is diglycolic acid.

8. The process of claim 5 wherein the dicarboxy acid is phthalic acid.

MELVIN DE GROOTE.
BERNHARD KEISER.

(References on following page)

REFERENCES CITED

The following references are of record in the file of this patent:

UNITED STATES PATENTS

| Number | Name | Date |
|---|---|---|
| 1,977,146 | Roberts | Oct. 16, 1934 |
| 1,978,227 | Roberts | Oct. 23, 1934 |
| 2,000,717 | Roberts | May 7, 1935 |
| 2,023,995 | De Groote et al. | Dec. 10, 1935 |
| 2,236,516 | Cahn et al. | Apr. 1, 1941 |
| 2,340,355 | Wirtel | Feb. 1, 1944 |
| 2,401,966 | Salathiel | June 11, 1946 |
| 2,423,364 | Blair et al. | July 1, 1947 |